April 14, 1942.     N. JAPOLSKY     2,279,402
ALTERNATING CURRENT ELECTRIC MOTOR
Filed Nov. 2, 1939
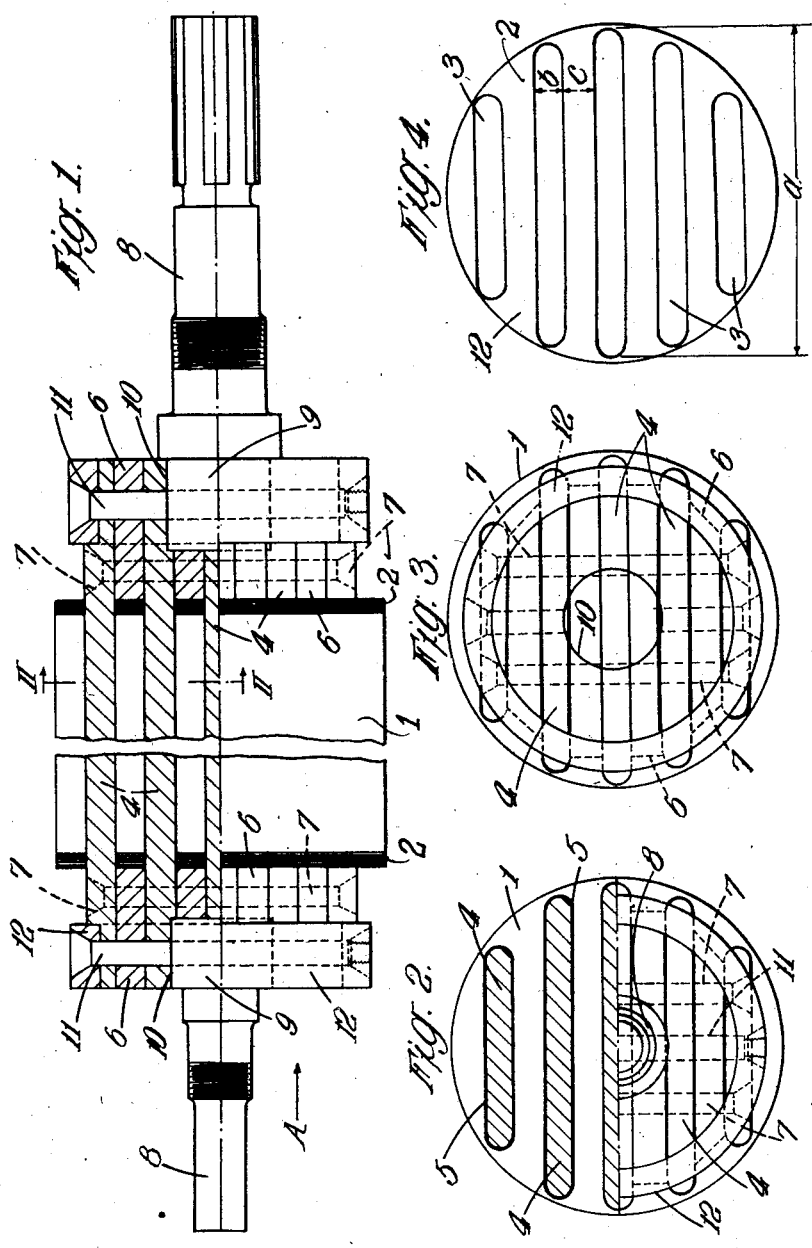
INVENTOR:
NICHOLAS JAPOLSKY
BY Haseltine Lake & Co.
ATTORNEYS.

Patented Apr. 14, 1942

2,279,402

UNITED STATES PATENT OFFICE 2,279,402

ALTERNATING CURRENT ELECTRIC MOTOR

Nicholas Japolsky, Highgate, London, England

Application November 2, 1939, Serial No. 302,469
In Great Britain November 22, 1938

5 Claims. (Cl. 172—120)

This invention relates to alternating current electric motors and is concerned with motors of the self-synchronising type, that is to say, motors which may run synchronously but which are also capable of operation as induction motors when synchronisation is disturbed.

Motors of the above kind have a wide range of usefulness, but they are of particular use in distant control systems where such motor constitutes the receiver as, for example, in my prior patent specification, Nos. 466,881 and 466,952. In such transmission systems it is important that the receiver motor shall not be sensitive to sudden jerks during the period of synchronous movement.

It is an object of the invention to provide a self-synchronising synchronous motor of the inductive or reactive type with fully utilised external surface.

It is a further object of the invention to provide a construction of motor in which the reluctance to the cross-flux is very great in comparison with the main flux.

Another object of the invention is to provide a construction of motor in which the reluctance of "distortion" flux, that is to say, of the flux which may be created by a part of the magnetomotive force of the cross flux is also very great, so that there is an effective damping of harmonics which are in consequence very small.

A still further object of the invention is to provide a motor which is a powerful damper and induction motor in the period of self-synchronisation so that the motor self-synchronises very easily under load.

In accordance with the invention, the rotor of the motor is of the two-pole kind and comprises a body portion having a plurality of paths of minimum magnetic reluctance by the formation within the peripheral confines of said body portion of a plurality of flat slots which run longitudinally through the body portion and substantially parallel to a plane passing through the axis of the rotor, the said slots containing conductor bars which are short-circuited by being connected to one another at the ends of the rotor to provide the necessary short-circuit cage for the inductive action.

The construction according to the invention results in the provision of a motor which is simple, cheap, highly efficient (owing to the effective damping of higher harmonics), highly self-synchronising even under full load, and one creating powerful synchronising forces in the case of momentary overload tending to put the motor out of step.

For a better understanding of the nature of the invention, a constructional form thereof will now be described with reference to the accompanying drawing, in which:

Figure 1 is a side elevation partly in longitudinal section of the complete rotor;

Figure 2 is an end view of the rotor looking in the direction of the arrow A in Figure 1, the view being partly in section along the line II—II in Figure 1;

Figure 3 is an end view of the rotor also looking in the same direction, but with the rotor shaft removed, and Figure 4 is a face view of one of the discs or laminae forming the body of the rotor.

In the illustrated embodiment, the rotor is for operation with a two-pole field. The body of the rotor, generally indicated at 1, is formed from thin steel discs or laminations 2, one of which is indicated in Figure 4. Each disc is of precisely the same shape, having a plurality of apertures or cavities 3 therein. As shown, there are five apertures in each disc, the apertures being shaped as flat slots arranged parallel to one another. The slots are symmetrically arranged so that one lies centrally along a diameter of the disc 2 while the others are arranged two on each side of the central slot. The central slot has the greatest width $a$ while those above and below it progressively diminish in width, but it will be noted that the widths of the various slots are such that the slots all lie within the peripheral confines of the rotor body 1, that is to say the slots do not extend to the curved surface of the rotor body. Preferably the slots are all of the same depth or thickness $b$ and the distance $c$ between each one is constant, this distance being the same as the depth of each slot. Thus, for example, with a disc of 3.96 inches diameter, the depth $b$ of each slot and the distance $c$ between each slot may each measure .36 inch.

A sufficient number of the discs 2, shaped in the manner indicated above, are placed one upon the other, with the slots in register, to build up the body 1 of the rotor. Within each of the cavities in the body 1, formed by the superposed slots, is located a copper bar 4. All the bars may be of the same thickness. Preferably, however, the bar occupying the centrally disposed cavity is a tight fit in this cavity, thereby serving as a register for all the discs, while the remaining bars are so dimensioned as to leave a slight clearance between them and the walls of their cavities, these bars being treated with a suitable insulating material, such as "Tufnol" varnish, which insulates them from electrical contact with the discs 2 and which substantially occupies the clearance, as indicated at 5 in Figure 2.

The bars 4 extend beyond the two ends of the rotor body 1 as indicated in Figure 1 and are short circuited one upon the other. A convenient arrangement is to provide between the exposed ends of the bars, copper packing pieces 6 which are soldered to the bars and then further secured by means of rivets 7 which pass through the bars and the packing pieces. The packing pieces bear firmly against the ends of the rotor body 1 and thereby hold the discs 2 constituting that body, rigidly together.

The rotor shaft is in two parts 8 the inner ends of which fit snugly in centrally disposed recesses 10 formed in the exposed ends of those of the bars 4 which lie in or about the axis of the rotor. The shaft parts 8 are each secured in position by means of a rivet 11 which passes through a metal ring 12 embracing the exposed ends of the bars (which are suitably recessed or chamfered for the purpose), and through the exposed ends of the bars, the packing pieces 6 and the inner end of the shaft part 8 as shown more particularly in Figure 1. It will be seen that the rivets 11 not only serve to secure the shaft parts 8 in position but also serve to increase the rigidity of the assembly as a whole.

A rotor made in the manner set forth above will be found to possess good properties as regards stability and will also produce rapid self-synchronisation.

What I claim and desire to secure by Letters Patent of the United States is:

1. For a self-synchronising synchronous motor a two-pole rotor comprising a body portion, a plurality of slots within the peripheral confines of said body portion, said slots extending longitudinally through the body portion, and substantially parallel to a plane passing through the axis of the rotor so as to leave between them in the body portion substantially parallel paths of minimum magnetic reluctance, conductor bars arranged in the said slots, said bars extending beyond the ends of the body portion so as to be exposed at their ends, packing pieces arranged between the exposed ends of the conductor bars so as to short circuit said bars, and a shaft for the body portion, said shaft being in two parts secured respectively to the exposed ends of the conductor bars.

2. A self-synchronising synchronous motor comprising a two-pole rotor having a rotor shaft, said rotor having a plurality of paths of minimum magnetic reluctance by the formation in the rotor of a plurality of flat slots which are of such a width that they are all accommodated interiorly of the peripheral confines of the rotor, said slots being arranged longitudinally in the body in the rotor and substantially parallel to a plane passing through the axis of the rotor so as to provide the rotor, between said slots, with parallel paths of minimum magnetic reluctance, and conductor bars housed in said slots, said bars being short-circuited by being connected to one another at the ends of the rotor to provide a short-circuit cage for the inductive action.

3. For a self-synchronising synchronous motor, a two-pole rotor comprising a body portion of cylindrical form, a plurality of slots running longitudinally through said body portion, said slots lying in substantially chordal parallel planes with respect to the cylindrical periphery of the body portion and varying in breadth from a maximum about a diameter near the rotor axis to a minimum near the sides of the rotor, the sides of the said slots being spaced from each other so as to leave between them in the rotor body portion substantially parallel paths of minimum magnetic reluctance, and conductor bars arranged in said slots, said bars being short-circuited by being connected to one another at the ends of the body portion to provide a short-circuit cage for the inductive action.

4. For a self-synchronising synchronous motor, a two-pole rotor comprising a cylindrically shaped body portion formed by the assembling together of a plurality of laminations of ferrous metal, each of said laminations having therein a plurality of spaced apertures so formed and arranged that when the laminations are placed together to constitute the body portion, said apertures provide in the body portion a plurality of spaced slots extending longitudinally therethrough, said slots lying in substantially chordal parallel planes with respect to the cylindrical periphery of the rotor and varying in breadth from a maximum about a diameter near the rotor axis to a minimum near the sides of the rotor, the sides of the said slots being substantially parallel to the same plane and the material of the body portion between the slots constituting substantially parallel paths of minimum magnetic reluctance, and conductor bars substantially filling said slots, said bars being short-circuited by being connected to one another at the ends of the rotor to provide a short-circuit cage for the inductive action.

5. For a self-synchronising synchronous motor, a two-pole rotor comprising a cylindrically shaped body portion of ferrous metal, a plurality of slots in said body portion and running longitudinally therethrough, said slots being closed slots with flat sides that are substantially chordal and parallel planes with respect to the cylindrical periphery of the rotor, the slots near the rotor axis having a breadth substantially equal to the diameter of the body portion while those remotest from the rotor axis have a breadth about equal to the radius of the body portion, said slots being spaced from each other so as to provide in the body portion substantially parallel paths of minimum magnetic reluctance, conductor bars of non-ferrous metal housed in said slots, said bars extending beyond the ends of the body portion so as to leave exposed ends and metallic packing pieces arranged between these exposed ends for the purpose of short-circuiting said bars, thereby providing a short-circuit cage for the inductive action.

NICHOLAS JAPOLSKY.